United States Patent
Liao et al.

(10) Patent No.: US 8,581,924 B2
(45) Date of Patent: Nov. 12, 2013

(54) METHOD AND MOBILE TERMINAL FOR ENABLING ANIMATION DURING SCREEN-SWITCHING

(75) Inventors: Hailiang Liao, Shenzhen (CN); Qihong Fu, Shenzhen (CN); Chi Zhang, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 13/504,952

(22) PCT Filed: Oct. 20, 2010

(86) PCT No.: PCT/CN2010/077916
§ 371 (c)(1),
(2), (4) Date: Apr. 28, 2012

(87) PCT Pub. No.: WO2012/024852
PCT Pub. Date: Mar. 1, 2012

(65) Prior Publication Data
US 2012/0212503 A1 Aug. 23, 2012

(30) Foreign Application Priority Data

Aug. 25, 2010 (CN) .......................... 2010 1 0267563

(51) Int. Cl.
*G09G 5/02* (2006.01)
(52) U.S. Cl.
USPC ........... 345/593; 345/581; 345/589; 345/600; 345/606; 345/611; 345/619; 345/473; 345/474; 345/475

(58) Field of Classification Search
None
See application file for complete search history.

(56) References Cited

U.S. PATENT DOCUMENTS 6,549,207 B1 * 4/2003 Matsumoto ................... 345/473

FOREIGN PATENT DOCUMENTS

| CN | 1681000 A | 10/2005 |
|---|---|---|
| CN | 101031085 A | 9/2007 |
| CN | 101441773 A | 5/2009 |
| CN | 101789133 A | 7/2010 |
| JP | 2003087572 A | 3/2003 |

* cited by examiner

*Primary Examiner* — Antonio A Caschera
(74) *Attorney, Agent, or Firm* — Bright IP Law Offices (57) ABSTRACT

A method and mobile terminal for enabling a screen-switching animation The method comprises the following steps of: setting color values for all the pixel points in a first and a second training image, wherein the colors values are different from one another; generating a training sequence with the color values of all the pixel points in the first and the second training image according to the conversion rule of each frame in a screen-switching animation; and playing a screen-switching animation between the current screen and the next screen according to the training sequence. The present invention increases the smoothness of a screen-switching animation and improves user experience.

12 Claims, 5 Drawing Sheets

METHOD AND MOBILE TERMINAL FOR ENABLING ANIMATION DURING SCREEN-SWITCHING

CROSS REFERENCE TO RELATED APPLICATIONS

This application is the U.S. National Stage of International Patent Application No. PCT/CN2010/077916 filed on Oct. 20, 2010, which claims priority to Chinese Patent Application No. 201010267563.9 filed on Aug. 25, 2010. Both the PCT Application and Chinese Application are hereby incorporated by reference in their entirety.

TECHNICAL FIELD OF THE INVENTION

The present invention relates to the field of communications and in particular to a method and mobile terminal for enabling a screen-switching animation.

BACKGROUND OF THE INVENTION

As mobile terminal technologies develop continuously, users have higher and higher requirements on the entertainment function of mobile terminals, there is developed a screen-switching animation technology for mobile terminals, which refers to a connecting animation appearing when the interface of a mobile terminal is switched from the current screen to a next screen. In order to improve the user interface (UI) effect of existing mobile terminal, a great number of complicated screen-switching animations are designed in the UI.

Screen-switching animation technology for mobile terminals can be divided into two-dimensional screen-switching animation and three-dimensional screen-switching animation. As to the UI design of mobile terminals, two-dimensional screen-switching animation without a three-dimensional effect typically comprises: fade-in/fade-out by sliding, fade-in/fade-out by scaling, color gradient, image gradient and the like; and three-dimensional screen-switching animation, which refers to all the screen-switching animations having a three-dimensional effect, typically comprises: cube flipper effect, flipper effect and the like.

Figure 1:
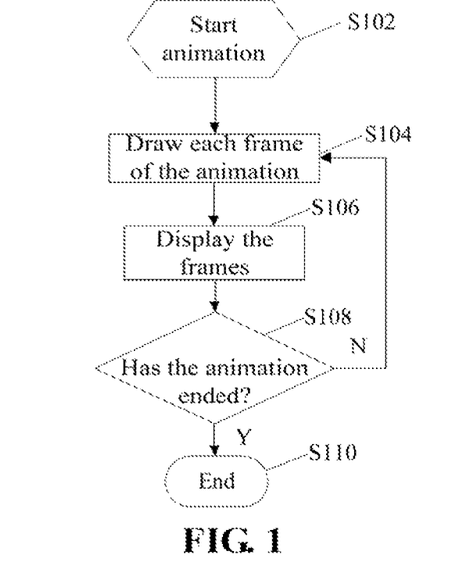
FIG. 1 is a flow chart illustrating the drawing of an animation rendered in real time according to the prior art.

The essence of a three-dimensional animation is to calculate, for any point in a three-dimensional space, the position where the point is projected on a background screen. Being a special three-dimensional animation, three-dimensional screen-switching animation aims to realize a transition between two screens with animation, therefore, three-dimensional screen-switching animation refers to a three-dimensional switching between two screens. Three-dimensional screen-switching animation technology carries out a calculation on two input screens to output a series of frames and displays the frames on a screen at a given time interval, thereby producing a three-dimensional screen-switching animation. As the more frames are output in a unit time, the smoother the animation is, and the better the effect is, three-dimensional screen-switching animation technology, on the other hand, leads to a large amount of calculation. The common animation that is rendered in real time is drawn according to the flow shown in FIG. 1, in which frames are drawn and displayed one by one controlled by a timer. FIG. 1 is a flow chart illustrating the drawing of an animation that is rendered in real time according to the prior art. As shown in FIG. 1, this flow comprises the following steps:

Step 102: starting an animation;
Step 104: drawing each frame of the animation;
Step 106: displaying the frames;
Step 108: determining whether or not the animation has ended, if so, executing Step 110, otherwise, executing Step 104;
and Step S110: ending.

The three-dimensional screen-switching animation technology of the prior art for mobile terminals is typically achieved using OpenGL ES and various other animation libraries (for enabling the Step 104 of the flow above). OpenGL ES is a 2D/3D lightweight graphics library dedicated to built-in devices and mobile devices. Most of high-end (intelligent) mobile phones are installed with a special graphics accelerator chip to accelerate a three-dimensional animation, which has a high requirement on the central processing unit (CPU) of a mobile terminal (mobile phone), while middle-end and low-end mobile terminals (mobile phones) are not equipped with accelerator chips and are therefore incapable of accelerating a three-dimensional animation. Besides, because it requires a large amount of calculation, a three-dimensional screen-switching animation can only be played on middle-end and low-end mobile terminals at a very low speed, falling far behind the smoothness required by a UI design, thus, a three-dimensional screen-switching animation can not be realized on middle-end and low-end mobile terminals.

SUMMARY OF THE INVENTION

It is the main objective of the present invention to provide a method and mobile terminal for enabling a screen-switching animation to address the problem existing in the prior art that a three-dimensional screen-switching animation requiring a large amount of calculation cannot be realized on middle-end and low-end mobile terminals.

In order to achieve the purpose above, according to an aspect of the present invention, there is provided a method for enabling a screen-switching animation, which comprises the following steps of:

setting color values for all the pixel points in a first and a second training images, wherein the colors values are different from one another; generating a training sequence with the color values of all the pixel points in the first and the second training images according to the conversion rule of each frame of a screen-switching animation; and playing a screen-switching animation between the current screen and the next screen according to the training sequence.

Further, setting color values for all the pixel points in the first and the second training images comprises:

setting color values for all the pixel points in the first training image according to the following formula:
inputFrame1[0]=1, inputFrame1[i]=i+1, wherein inputFrame1[i] represents the color value of the ith pixel point in the first training image, $0 \le i \le width*height-1$, width represents the width of the first training image, and height represents the height of the first training image; and setting color values for all the pixel points in the second training image according to the following formula:

inputFrame2[0]=width*height+1, inputFrame2[i]=width*height+i+1, wherein inputFrame2[i] represents the color value of the ith pixel point in the second training image, $0 \le i \le width*height-1$, width represents the width of the second training image, and height represents the height of the second training image; the height and the width of the first training image are both equal to the height and the width of the second training image, respectively.

Further, generating a training sequence with the color values of all the pixel points in the first and the second training images according to the conversion rule of each frame in a screen-switching animation comprises: respectively storing the color values of the corresponding pixel points in the first and the second training images in queues according to the conversion rule of each frame in a screen-switching animation; and combining the queues to generate a training sequence.

Further, playing a screen-switching animation between the current screen and the next screen according to the training sequence comprises: reading data from the training sequence; determining corresponding pixel position of the data in the first or second training images; and reading the color value of the corresponding pixel position in the current or next screens and outputting the color value.

Further, the anti-aliasing effect and the bitmap filtering effect of the screen-switching animation are turned off during the operation of screen-switching animation; and the color values are set with 32-bit true color.

In order to achieve the purpose above, according to another aspect of the present invention, there is provided a mobile terminal, which comprises:

a setting module for setting color values for all the pixel points in a first and a second training images, wherein the colors values are different from one another; a generation module for generating a training sequence with the color values of all the pixel points in the first and the second training images according to the conversion rule of each frame in a screen-switching animation; and a screen-switching animation module for playing a screen-switching animation between the current screen and the next screen according to the training sequence.

Further, the setting module comprises: a first setting sub-module for setting color values for all the pixel points in the first training image according to the following formula:

$$\text{inputFrame1}[0]=1, \text{inputFrame1}[i]=i+1,$$

wherein inputFrame1[i] represents the color value of the ith pixel point in the first training image, $0 \le u \le \text{width}*\text{height}-1$, width represents the width of the first training image, and height represents the height of the first training image;

and a second setting sub-module for setting color values for all the pixel points in the second training image according to the following formula:

$$\text{inputFrame12}[0]=\text{width}*\text{height}+1,$$
$$\text{inputFrame2}[i]=\text{width}*\text{height}+i+1,$$

wherein inputFrame2[i] represents the color value of the ith pixel point in the second training image, $0 \le i \le \text{width}*\text{height}-1$, width represents the width of the second training image, and height represents the height of the second training image; the height and the width of the first training image are both equal to the height and the width of the second training image.

Further, the generation module comprises: a storage sub-module for respectively storing the color values of all the corresponding pixel points in the first and the second training image in queues according to the conversion rule of each frame in a screen-switching animation; and a combination sub-module for combining the queues to generate a training sequence.

Further, the screen-switching animation module comprises: a first reading sub-module for reading data from the training sequence; a determination sub-module for determining corresponding pixel position of the data in the first or second training images; a second reading sub-module for reading the color value of the corresponding position in the current or next screens; and an output sub-module for outputting the color value.

The mobile terminal further comprises a processing module for turning off the anti-aliasing effect and the bitmap filtering effect of the screen-switching animation during the operation of the screen-switching animation.

By setting color values for all the pixel points in a first and second training images, wherein color values are different from one another, generating a training sequence with the color values of all the pixel points in the first and the second training images according to the conversion rule of each frame of a screen-switching animation, and playing a screen-switching animation between the current screen and the next screen according to the training sequence, the present invention overcomes the problem existing in the prior art that a three-dimensional screen-switching animation cannot be realized on middle-end and low-end mobile telephones and thereby improves user experience.

BRIEF DESCRIPTION OF THE DRAWINGS

The accompanying drawings illustrated herein are provided for a better understanding of the present invention and form one part of this disclosure, and the exemplary embodiments of the present invention and the description thereof are for explaining the invention but not limiting the invention. In the accompanying drawings.

DETAILED DESCRIPTION OF THE EMBODIMENTS

The invention is described below in detail by reference to the accompanying drawings in conjunction with exemplary embodiments. It should be noted that the embodiments of the present invention and the features thereof can be combined with each other if no conflict is caused.

Figure 2:
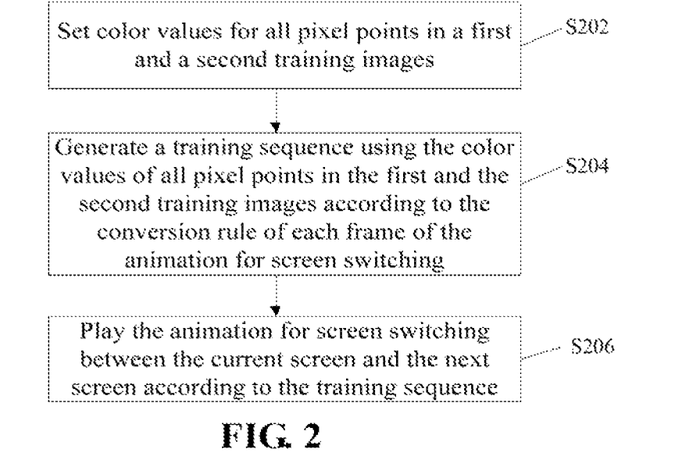
FIG. 2 is a flow chart illustrating a method for enabling a screen-switching animation according to an embodiment of the present invention.

According to an embodiment of the present invention, there is provided a method for enabling a screen-switching animation, FIG. 2 is a flow chart of the method for enabling a screen-switching animation according to an embodiment of the invention, as shown in FIG. 2, the method comprises the following steps:

Step S202: setting color values for all the pixel points in a first and a second training images, wherein the colors values are different from one another;

Step S204: generating a training sequence with the color values of all the pixel points in the first and the second training images according to the conversion rule of each frame in a screen-switching animation;

and Step S206: playing a screen-switching animation between the current screen and the next screen according to the training sequence.

By setting color values for all the pixel points in a first and a second training images, wherein color values are different from one another, generating a training sequence with the color values of all the pixel points in the first and the second training images according to the conversion rule of each frame of a screen-switching animation, and playing a screen-switching animation between the current screen and the next screen according to the training sequence, the method provided herein avoids the problem existing in the prior art that as middle-end and low-end mobile terminals (mobile phones) are not equipped with accelerator chips and are therefore incapable of accelerating a three-dimensional animation, a three-dimensional screen-switching animation, which requires a large amount of calculation, can only be operated on such mobile terminals at a very low speed, falling far behind the smoothness required by a UI design, and finally fails in running on such mobile terminals (mobile phones), thereby improving the quality and the smoothness of the three-dimensional screen-switching animation and consequentially improving user experience.

Below is illustration on a preferred embodiment of the color value setting for all the pixel points in a first and second training image that is described in Step 202. The color values of all the pixel points in the first training image are set according to the following formula: inputFrame1[0]=1, inputFrame1[i]=i+1, wherein inputFrame1[i] represents the color value of the ith pixel point in the first training image, $0 \leq i \leq width*height-1$, width represents the width of the first training image, and height represents the height of the first training image; and the color values of all the pixel points in the second training image are set according to the following formula: inputFrame2[0]=width*height+1, inputFrame2[i]=width*height+i+1, wherein inputFrame2[i] represents the color value of the ith pixel point in the second training image, $0 \leq i \leq width*height-1$, width represents the width of the second training image, and height represents the height of the second training image. By setting color values for all the pixel points in the first and the second training images to be different from one other and calculating the positions of each pixel point in the first and the second training images with the color values of the pixel point, the preferred embodiment realizes an accurate positioning for a color value.

Below is illustration on a preferred embodiment of the generation of a training sequence with the color values of all the pixel points in the first and the second training images according to the conversion rule of each frame in a screen-switching animation that is described in Step 204. The color values of corresponding pixels in the first and the second training images are stored in queues according to the conversion rule of each frame in a screen-switching animation, and the queues are combined into a training sequence. By matching the conversion rule of each frame of the screen-switching animation with the color values of a pixel in the first and the second training images, the preferred embodiment can accurately determine, according to the color value, the pixel position of a corresponding color value in the frame.

Described below is the performance of playing a screen-switching animation between the current screen and the next screen according to the training sequence that is described in Step 206. Data in the training sequence is read first, wherein the data refers to the color value of a pixel in the first or second training images, then, corresponding pixel position of the data in the first or second training images is determined, and finally the color value of the corresponding position is read in the current or next screens and then output. By determining the position of a pixel corresponding to the rule of a frame in the screen-switching animation, reading the color value of a corresponding point in the current or next screens, and outputting the read color value, the preferred embodiment realizes the image output of a frame.

Preferably, the anti-aliasing effect and the bitmap filtering effect of the screen-switching animation are turned off in the operation of screen-switching animation. This preferred embodiment also avoids a color blending. In this embodiment, the essence of the training image is to realize a color-based positioning, therefore, if a color blending, in addition to a three-dimensional projection calculation, is performed on each pixel point during a three-dimensional animation drawing process, the color of the drawn image will no longer have a positioning function, that is, a color value subjected to a blending processing is incapable of determining the source of a pixel of the target frame.

Preferably, the color values are set with 32-bit true color. Defining colors with an existing rule lowers development cost.

Figure 3:
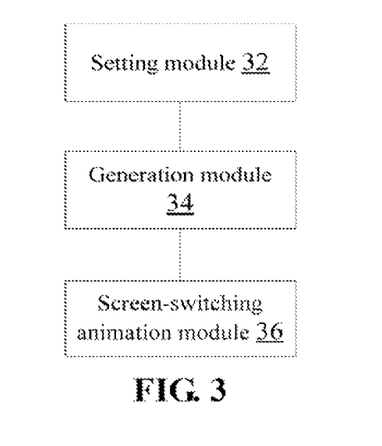
FIG. 3 is a block diagram illustrating the structure of a mobile terminal according to an embodiment of the present invention.

In accordance with an embodiment of the present invention, there is provided a mobile terminal, FIG. 3 is a block diagram illustrating the structure of a mobile terminal according to an embodiment of the present invention, the mobile terminal comprises: a setting module 32, a generation module 34 and a screen-switching animation module 36, which are described below in detail.

The setting module 32 is used for setting color values for all the pixel points in a first and a second training images, wherein the colors values are different from one another; the generation module 34 is connected with the setting module 32 to generate a training sequence with the color values of all the pixel points in the first and the second training images set by the setting module 2 according to the conversion rule of each frame in a screen-switching animation; and the screen-switching animation module 36 is used for playing a screen-switching animation between the current screen and the next screen according to the training sequence generated by the generation module 34.

Figure 4:
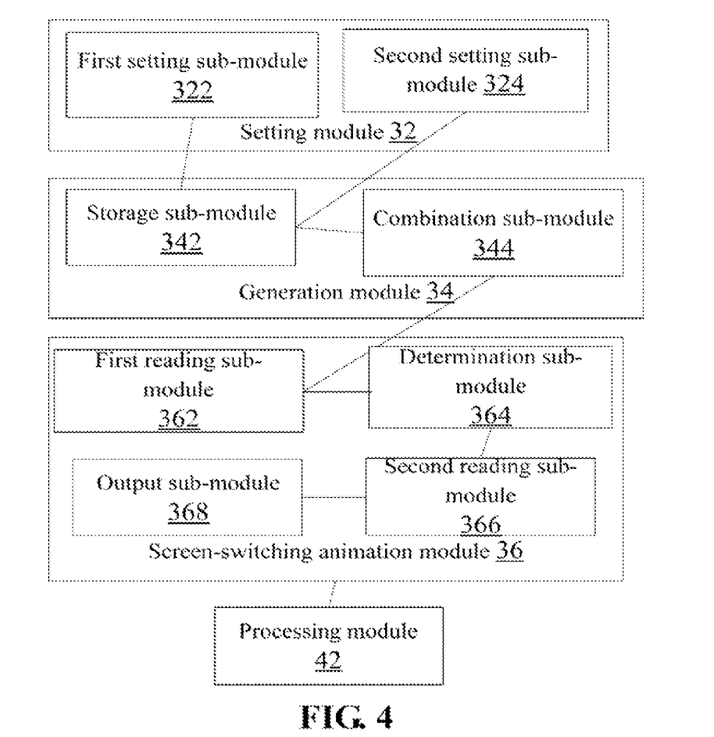
FIG. 4 is a block diagram illustrating a preferred structure of a mobile terminal according to an embodiment of the present invention.

FIG. 4 is a block diagram illustrating a preferred structure of a mobile terminal according to an embodiment of the present invention, as shown in FIG. 4, the mobile terminal further comprises a processing module 42, wherein the setting module 32 comprises a first setting sub-module 322 and a second setting sub-module 324; the generation module 34 comprises: a storage sub-module 342 and a combination sub-module 344; and the screen-switching animation module 36 comprises: a first reading sub-module 362, a determination sub-module 364, a second reading sub-module 366 and an output sub-module 368; each of the aforementioned structures is described below in detail.

The first setting sub-module 322 is used for setting color values for all the pixel points in the first training image according to the following formula: inputFrame1[0]=1, inputFrame1[i]=i+1, wherein inputFrame1[i] represents the color value of the ith pixel point in the first training image, $0 \leq i \leq width*height-1$, width represents the width of the first training image, and height represents the height of the first training image; and the second setting sub-module 324 is used for setting color values for all the pixel points in the second training image according to the following formula: inputFrame12[0]=width*height+1, inputFrame2[i]=width*height+i+1, wherein inputFrame2[i] represents the color value of the ith pixel point in the second training image, 0≤i≤width*height−1, width represents the width of the second training image, and height represents the height of the second training image.

The generation module 34 comprises: the storage sub-module 342 which is connected with the first setting sub-module 322 and the second setting sub-module 325 to respectively store the color values of all the corresponding pixel points in the first and the second training images in queues according to the conversion rule of each frame in a screen-switching animation; the combination sub-module 344, which is connected with the storage sub-module 342, is used to combine the queues stored in the storage sub-module 342 and generate the training sequence.

The screen-switching animation module 36 comprises: the first reading sub-module 362 which is connected with the combination sub-module 344 to read data from the training sequence combined by the combination sub-module 344, wherein the data refers to the color value of a pixel in the first or second training images; the determination sub-module 364 is connected with the first reading sub-module 362 to determine the corresponding pixel position of the data read by the first reading sub-module 362 in the first or second training images; the second reading sub-module 366 is connected with the determination sub-module 364 to read the color value of the corresponding position determined by the determination sub-module 364 in the first or second training images and output the color value of the corresponding pixel; the output sub-module 368 is connected with the second reading sub-module 366 to output the color value read by the second reading sub-module 366.

The processing module 42 is connected with the screen-switching animation module 36 to turn off the anti-aliasing effect and the bitmap filtering effect of the screen-switching animation during the operation of the screen-switching animation.

Embodiment 1

Figure 5:
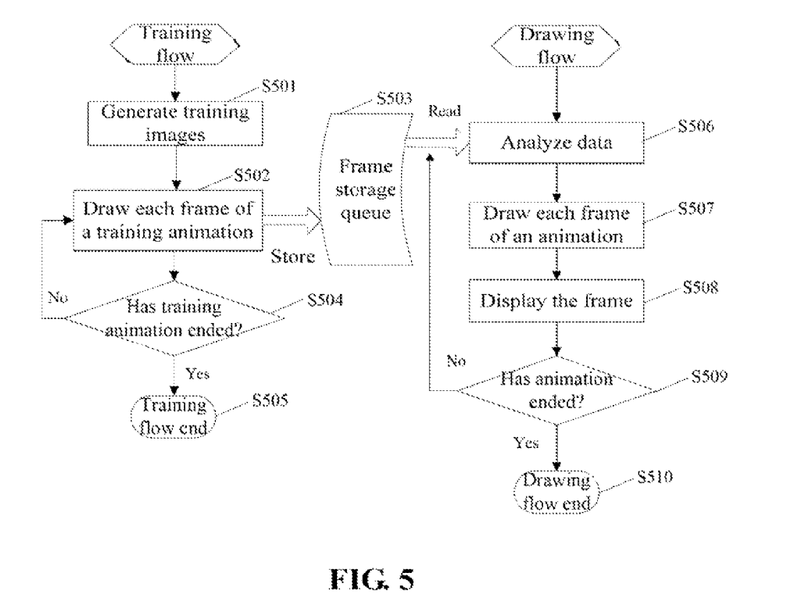
FIG. 5 is a flow chart illustrating the rendering of a three-dimensional animation according to an embodiment of the present invention.

By combining the aforementioned embodiments and preferred implementation modes thereof, this embodiment provides a three-dimensional animation rendering method, which comprises a training flow (process) and a drawing flow (process) that are integrated with each other through a frame storage queue. FIG. 5 is a flow chart illustrating the rendering of a three-dimensional animation according to an embodiment of the present invention. As shown in FIG. 5, the training process, during which a three-dimensional screen-switching animation drawing engine is trained with two specific images, specifically comprises the following steps:

Step 501: generating training images;

preferably, in this step, training images are specifically generated by: setting the color value of the first pixel in a training image 1 to be 1 and that of each other pixel in the training image 1 to be the sum of the color value of the previous pixel and 1, and setting the color value of the first pixel in a training image 2 to be the sum of the pixel value of the last pixel in the training image 1 and 1 and that of each other pixel in the training image 2 to be the sum of the color value of the previous pixel and 1; the reason for setting pixels in "Training Image 1" and "Training Image 2" this way is to make the color value of each pixel in "Training Image 1" and "Training Image 2" different from one another, and to enable calculating the position of each pixel point in "Training Image 1" and "Training Image 2" using the color value of the pixel point, thereby achieving a positioning result;

Step 502: drawing each frame of a training animation;

Step 503: storing the output frames of the training animation in a frame storage queue;

Step 504: determining whether or not the training animation has ended, if so, executing Step 505, otherwise, executing Step 502;

an animation rendering flow, which refers substantially to a specific drawing process that is completed by analyzing the data stored in the frame storage queue with a requirement of inputting two actual images (assumed to be an input image 1 and an input image 2), specifically comprises the following steps:

Step 506: reading and analyzing the data stored in the frame storage queue;

preferably, reading and analyzing the data stored in the frame storage queue refers to determining the source image (training image 1 or image 2) of each pixel of a frame in the frame storage queue and the specific position of the pixel in the source image according to the color value of the pixel;

Step 507: drawing each frame of an animation according to the result of the analysis;

preferably, drawing each frame of an animation according to the result of the analysis refers to reading, in the case where the pixel is a pixel at a position of the training image 1, the color value of a pixel at the same position in the input image 1, or reading, in the case where the pixel is a pixel at a position of the training image 2, the color value of a pixel at the same position in the input image 2;

Step 508: displaying the frame;

and Step 509: determining whether or not the animation has ended, if so, executing Step 510, otherwise, executing Step 506;

Compared with the prior art, the method disclosed herein with a capability of optimizing existing three-dimensional screen-switching animation enables a three-dimensional screen-switching animation to be operated more smoothly on the same mobile telephone.

It should be noted that the method for enabling a three-dimensional screen-switching animation is divided into a training flow and an actual rendering flow which is based upon the training flow.

By storing the projection positions of two images through a color-based positioning which avoids a projection position calculation for each point in a three-dimensional space, this preferred embodiment avoids repeated projection position calculation during the three-dimensional rendering process and therefore greatly saves three-dimensional rendering time and improves the smoothness of a three-dimensional animation.

Embodiment 2

Figure 6:
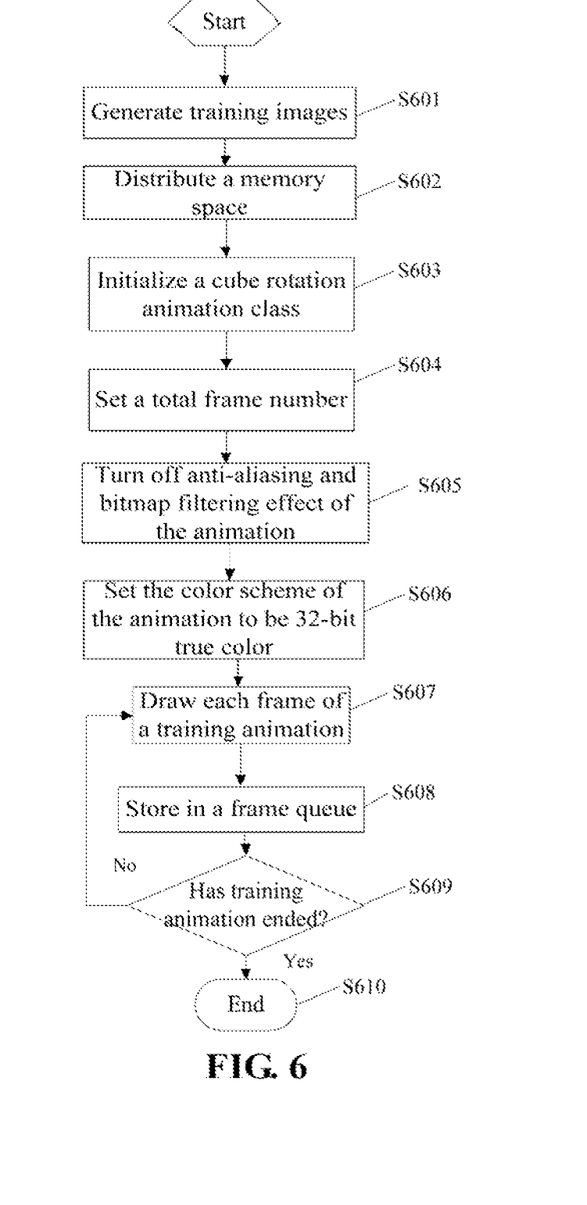
FIG. 6 is a flow chart illustrating a training process according to an embodiment of the present invention.

In this embodiment, there is provided a method for enabling a training flow during a screen-switching animation realization process, FIG. 6 is a flow chart illustrating a training process according to an embodiment of the present invention. In this embodiment, a training flow, which carries out a drawing training by inputting a training image 1 and a training image 2 to obtain a series of training frames that are then stored in a frame queue, specifically comprises the following steps:

Step 601: defining a training image 1, a training image 2 and the indicator of an output buffer region to be: inputFrame1, inputFrame2 and outputFrame, and generating a training sequence;

Step 602: distributing a memory space for the buffer region and initializing inputFrame1 and inputFrame2;

preferably, inputFrame1 and inputFrame2 are initialized in Step 602; a buffer region can be defined to be in a unsigned long format; as the color value of each pixel is in a 32-bit format, four bytes respectively represent alpha, red, green and blue; the content in a buffer region pointed by inputFrame1 is defined as follows: inputFrame1[0]=1, inputFrame1[1]=2, . . . , and inputFrame1 [width*height−1]= width*height; the content in a buffer region pointed by inputFrame2 is defined as follows: inputFrame2[0]= width*height+1, inputFrame2[1]=width*height+2, . . . inputFrame2 [width*height−1]=2*width*height; in the two definitions above, width represents the width of an image, and height represents the height of an image;

Step 603: initializing a cube rotation animation class: AnimationCube *pAniCube=new AnimationCube;

Step 604: a frame setting total number: pAniCube→SetTotalFrames(frameNumber);

Step 605: turning off the anti-aliasing effect and the bitmap filtering effect of the animation;

it should be noted that the anti-aliasing effect and the bitmap filtering effect of the animation are turned off in Step 605 to avoid a color blending; the essence of the training is to realize a color-based positioning, therefore, if a color blending processing, in addition to a three-dimensional projection calculation, is performed on each pixel point during a three-dimensional animation drawing process, the color of the drawn image will no longer have a positioning function, that is, a color value subjected to a blending processing is incapable of determining the source of a pixel of the target frame;

Step 606: setting the color scheme of the animation to be 32-bit true color;

Step 607: setting the inputs of the animation to be inputFrame1 and inputFrame2 and drawing each frame of a training animation;

Step 608: starting the animation, storing training frames in outputFrame, and storing the content in the outputFrame in a frame queue;

and Step 609: determining whether the animation is ended, if so, executing Step 610, otherwise, executing Step 607.

Embodiment 3

Figure 7:
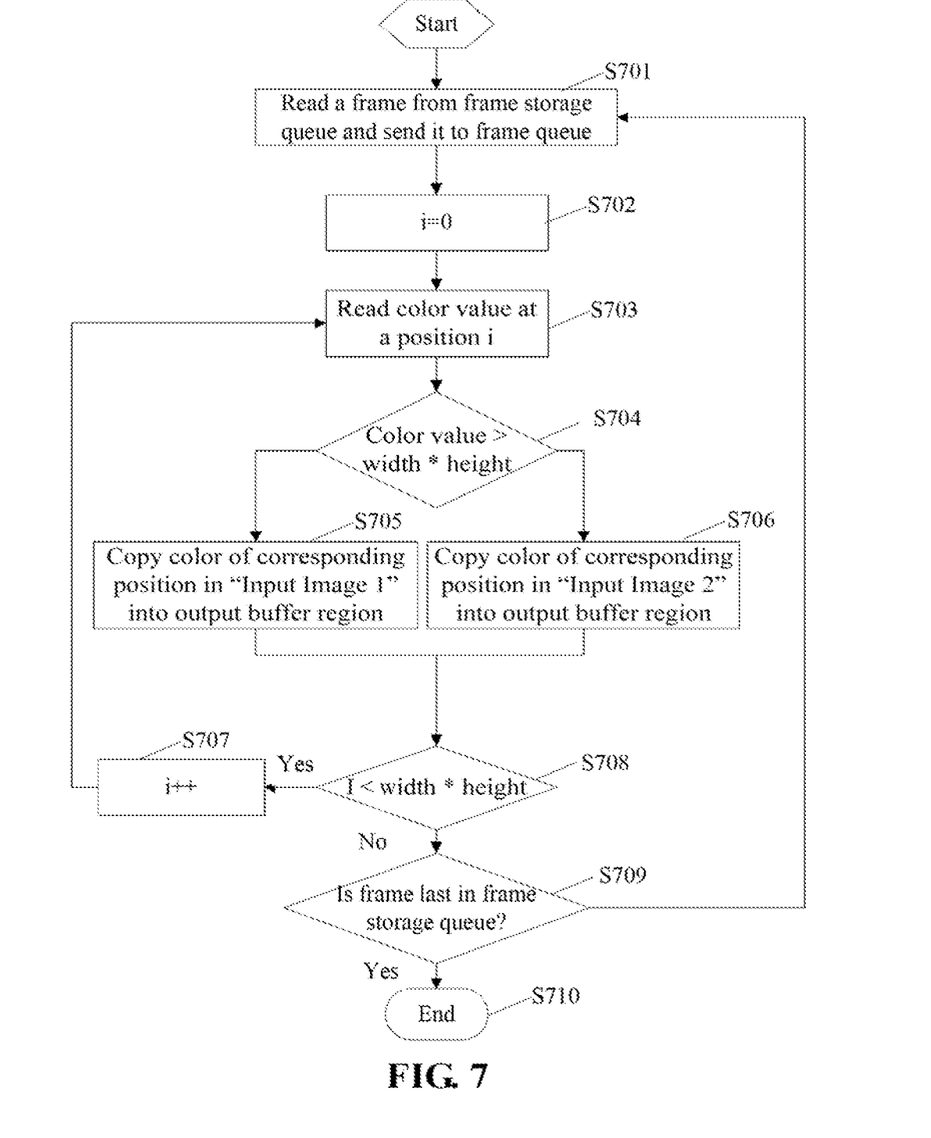
FIG. 7 is a flow chart illustrating a drawing process according to an embodiment of the present invention.

In this embodiment, there is provided a method for enabling a drawing flow in a screen-switching animation realization process, FIG. 7 is a flow chart illustrating a drawing process according to an embodiment of the present invention. In this embodiment, FIG. 7 shows the detailed flow of a drawing process. The drawing process, which is completed with the training frames in a frame queue, comprises a positioning flow and a copying flow. In order to make the whole drawing process described more simply, in this embodiment, it is assumed that innerFrame represents a frame in a frame queue, inputFrame 1 represents the indicator of an input image 1, inputFrame 2 represents the indicator of an input image 2, and outputFrame represents the address of an output buffer region. Specifically, the drawing process comprises the following steps:

Step 701: reading a frame from a frame storage queue and transmitting the address of the frame buffer region of the read frame to innerFrame (frame queue);

Step 702: setting an index i to be 0;

Step 703: reading the color value at a position i: color=innerFrame [i];

Step 704: determining the source position of the pixel according to the color value, that is, determining whether or not the color value is greater than width*height, if so (that is, the pixel belongs to the training image 2), executing Step 706, otherwise (that is, the pixel belongs to the training image 1), executing Step 705;

Step 705: copying the color of a corresponding position in the input image 1 into the output buffer region: outputFrame[i]=inputFrame1[color−1];

Step 706: copying the color of a corresponding position in the input image 2 into the output buffer region: outputFrame[i]=inputFrame2[color-width*height−1];

Step 707: determining whether or not i is smaller than width*height, if so, executing Step 708, otherwise, executing Step 709;

Step 708: adding i with 1;

Step 709: determining whether or not the training frame is the last frame in the frame storage queue, if so, executing Step 710, otherwise, executing Step 701;

and Step S710: ending.

By training the drawing of a three-dimensional animation, storing the result of the training, and accelerating the three-dimensional screen-switching animation with the result of the training, the embodiments described above achieve a smooth three-dimensional screen-switching animation with less calculation, improve the smoothness of the animation, and enhance user experience.

Apparently, it should be understood by those skilled in this art that the modules or steps of the invention can be realized by a universal computer, centralized on a single computer or distributed on a network consisting of multiple computers, and optionally realized by computer-executable program codes; the modules or steps can be therefore stored in a storage device to be executed by a computer in an order different from this illustrated therein or separately manufactured into integrated circuit modules, or some of the modules or steps are manufactured into a single integrated circuit module. Thus, the invention is not limited to any special combination of hardware and software.

The mentioned above is only preferred embodiments of the invention but not limitation to the invention, various modification and variations can be devised by those skilled in this art, and it should be understood that any modification, equivalent and improvement devised without departing from the spirit and scope of the invention belong to the protection scope of the invention.

What is claimed is:

1. A method for enabling a screen-switching animation, comprising:

a processor setting color values for all pixel points in a first and a second training images, wherein the colors values are different from one another;

the processor generating a training sequence using the color values of all the pixel points in the first and the second training images according to a conversion rule of each frame of the screen-switching animation; and the processor playing screen-switching animation from a current screen and a next screen according to the training sequence;

wherein the processor setting color values for all pixel points in a first and a second training image comprises:

the processor setting color values for all the pixel points in the first training image according to a formula as follows: inputFrame1[0]=1, inputFrame1[i]=i+1, wherein inputFrame1[i] represents a color value of an ith pixel point in the first training image, 0≤i≤width*height−1, width represents a width of the first training image, and height represents a height of the first training image; and the processor setting color values for all the pixel points in the second training image according to a formula as follows: inputFrame2[0]=width*height+1, inputFrame2[i]=width*height+i+1, wherein inputFrame2[i] represents a color value of an ith pixel point in the second training image, 0≤i≤width*height−1, width represents a width of the second training image, and height represents a height of the second training image; the height and the width of the first training image are equal to the height and the width of the second training image, respectively.

2. The method according to claim 1, wherein the processor generating a training sequence with the color values of all the pixel points in the first and the second training images according to a conversion rule of each frame in a screen-switching animation comprises:
the processor respectively storing the color values of all the pixel points in the first training image and the color values of corresponding pixel points in the second training image in queues according to the conversion rule of each frame in the screen-switching animation; and
the processor combining the queues to generate the training sequence.

3. The method according to claim 2, wherein
anti-aliasing effect and bitmap filtering effect of the screen-switching animation are turned off by the processor during the screen-switching animation; and
color values are set with 32-bit true color by the processor.

4. The method according to claim 1, wherein the processor playing screen-switching animation between a current screen and a next screen according to the training sequence comprises:
the processor reading data from the training sequence;
the processor determining a corresponding pixel position of the data in the first or second training images; and
the processor reading the color value of the corresponding pixel position in the current or next screen and outputting the color value.

5. The method according to claim 4, wherein
anti-aliasing effect and bitmap filtering effect of the screen-switching animation are turned off by the processor during the screen-switching animation; and
color values are set with 32-bit true color by the processor.

6. The method according to claim 1, wherein
anti-aliasing effect and bitmap filtering effect of the screen-switching animation are turned off by the processor during the screen-switching animation; and
color values are set with 32-bit true color by the processor.

7. A mobile terminal, comprising:
a processor configured to execute program units stored on a memory, the program units comprising:
a setting module for setting color values for all pixel points in a first and a second training images, wherein the colors values are different from one another;
a generation module for generating a training sequence with the color values of all the pixel points in the first and the second training images according to a conversion rule of each frame in the screen-switching animation; and
a screen-switching animation module for playing screen-switching animation between a current screen and a next screen according to the training sequence;
wherein the setting module comprises:
a first setting sub-module for setting color values for all the pixel points in the first training image according to a formula as follows: inputFrame1[0]=1, inputFrame1[i]=i+1, wherein inputFrame1[i] represents a color value of an ith pixel point in the first training image, 0≤i≤width*height−1, width represents a width of the first training image, and height represents a height of the first training image; and
a second setting sub-module for setting color values for all the pixel points in the second training image according to a formula as follows: inputFrame12[0]=width*height+1, inputFrame2[i]=width*height+i+1, wherein inputFrame2[i] represents a color value of an ith pixel point in the second training image, 0≤i≤width*height−1, width represents a width of the second training image, and height represents a height of the second training image; the height and the width of the first training image are equal to the height and the width of the second training image, respectively.

8. The mobile terminal according to claim 7, wherein the generation module comprises:
a storage sub-module for respectively storing the color values of all the pixel points in the first image and the color values of corresponding pixel points in the second training image in queues according to the conversion rule of each frame in the screen-switching animation; and
a combination sub-module for combining the queues to generate the training sequence.

9. The mobile terminal according to claim 8, further comprising:
a processing module for turning off anti-aliasing effect and the bitmap filtering effect of screen-switching animation during the screen-switching animation.

10. The mobile terminal according to claim 7, wherein the screen-switching animation module comprises:
a first reading sub-module for reading data from the training sequence;
a determination sub-module for determining a corresponding pixel position of the data in the first or second training images;
a second reading sub-module for reading the color value of the corresponding pixel position in the current or next screen; and
an output sub-module for outputting the color value.

11. The mobile terminal according to claim 10, further comprising:
a processing module for turning off anti-aliasing effect and the bitmap filtering effect of screen-switching animation during the screen-switching animation.

12. The mobile terminal according to claim 7, further comprising:
a processing module for turning off anti-aliasing effect and the bitmap filtering effect of screen-switching animation during the screen-switching animation.

* * * * *